US010395348B2

(12) United States Patent
Kawai

(10) Patent No.: US 10,395,348 B2
(45) Date of Patent: Aug. 27, 2019

(54) IMAGE PICKUP APPARATUS, IMAGE PROCESSING APPARATUS, AND CONTROL METHOD OF IMAGE PICKUP APPARATUS

(71) Applicant: CANON KABUSHIKI KAISHA, Tokyo (JP)

(72) Inventor: Yusuke Kawai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/933,857

(22) Filed: Mar. 23, 2018

(65) Prior Publication Data

US 2018/0286020 A1 Oct. 4, 2018

(30) Foreign Application Priority Data

Mar. 31, 2017 (JP) ................................ 2017-072926

(51) Int. Cl.

| | |
|---|---|
| ***H04N 5/232*** | (2006.01) |
| ***G06T 5/00*** | (2006.01) |
| ***G02B 7/34*** | (2006.01) |
| ***G02B 7/38*** | (2006.01) |
| ***G06T 7/571*** | (2017.01) |
| ***G06T 5/50*** | (2006.01) |
| ***G02B 27/00*** | (2006.01) |

(52) U.S. Cl.

CPC ................ *G06T 5/003* (2013.01); *G02B 7/34* (2013.01); *G02B 7/38* (2013.01); *G02B 27/0075* (2013.01); *G06T 5/50* (2013.01); *G06T 7/571* (2017.01); *H04N 5/23212* (2013.01); *H04N 5/23229* (2013.01); *H04N 5/232133* (2018.08); *G06T 2207/10148* (2013.01); *G06T 2207/20021* (2013.01); *G06T 2207/20212* (2013.01)

(58) Field of Classification Search

CPC .......... G06T 5/003; G06T 5/50; G06T 7/571; G06T 2207/20212; G06T 2207/10148; G06T 2207/20021; G02B 27/0075; G02B 7/34; G02B 7/38; H04N 5/23212

See application file for complete search history.

(56) References Cited

U.S. PATENT DOCUMENTS 8,619,082 B1 * 12/2013 Ciurea ................ H04N 13/232
345/427
9,313,419 B2 * 4/2016 Tanaka ................ H04N 5/2621
(Continued)

FOREIGN PATENT DOCUMENTS

JP 2015-216532 A 12/2015

*Primary Examiner* — Shahbaz Nazrul

(74) *Attorney, Agent, or Firm* — Canon U.S.A., Inc., IP Division

(57) ABSTRACT

An image pickup apparatus includes an image capturing unit, an optical system, and a control unit. The control unit causes the image capturing unit to capture images while moving an in-focus position of the optical system to a plurality of positions to form a plurality of images with different in-focus positions, and causes the image capturing unit to capture images with an aperture set to a depth of field deeper than depths of field for the plurality of images with the different in-focus positions to form a reference image. A combining unit compares the reference image to the plurality of images with the different in-focus positions, and combines images using the plurality of images with the different in-focus positions and the reference image based on a result of the comparison.

16 Claims, 9 Drawing Sheets

(56) References Cited

U.S. PATENT DOCUMENTS

| | | | | |
|---|---|---|---|---|
| 2013/0057681 | A1* | 3/2013 | Kawamura | H04N 5/23212 348/135 |
| 2015/0326798 | A1* | 11/2015 | Muto | H04N 5/23229 348/239 |
| 2015/0358542 | A1* | 12/2015 | Sato | H04N 5/265 348/239 |
| 2017/0324895 | A1* | 11/2017 | Bryll | G06T 7/0004 |
| 2018/0172987 | A1* | 6/2018 | Pascoguin | G02B 27/0075 |

* cited by examiner

IMAGE PICKUP APPARATUS, IMAGE PROCESSING APPARATUS, AND CONTROL METHOD OF IMAGE PICKUP APPARATUS

BACKGROUND

Field of the Disclosure

The present patent application generally relates to an apparatus for, and a method of, image processing, and in particular it relates to an image pickup apparatus for, and a method of, processing a plurality of images with difference in-focus positions.

Description of Related Art

In some cases, an image pickup apparatus such as a digital camera or a video camera captures an image including a plurality of subjects largely different from each other in a distance from the image pickup apparatus or an image of a subject that is long in a depth direction. In such cases, only a part of the subject(s) may be possible to be brought into focus due to an insufficient depth of field. In this context, Japanese Patent Application laid-Open No. 2015-216532 discusses a technique related to what is known as "focus stacking". More specifically, in focus stacking, a plurality of images with different in-focus positions is captured, and only in-focus areas are extracted from the images to be combined into a single combined image in which an imaging area is entirely in focus. The focus stacking technique is also known as focal plane merging, all-in-focus, or z-stacking. The combining of images having different focal planes is performed by an image processor through image analysis, for example, using edge detection of various in-focus areas captured at different focal planes.

Although the focusing stacking technique may improve the focusing on objects at different depths of field, the combined image obtained by the method of focus stacking cannot be completely free of blurring in some areas.

For example, subject areas away from each other in the depth direction may be overlapped with each other. In such a case, when the image pickup apparatus focuses on the closer subject, an image of the farther subject is largely blurred. When the image pickup apparatus focuses on the farther subject, an image of the closer subject is largely blurred. In such a case, a combined image includes a blurred area regardless of which one of the image captured with the closer subject being in focus and the image captured with the farther subject being in focus is selected.

This case is described in more detail, by illustrating a case where an image including two subjects 901 and 902 is captured. FIG. 9A is a diagram illustrating positional (depth) relationship among a digital camera 100, a subject 901, and a subject 902. FIG. 9B illustrates an image captured with the subject 901, which is closer to the camera 100, being brought into focus. FIG. 9C illustrates an image captured with the subject 902, which is farther from the camera 100, being brought into focus. FIG. 9D is an enlarged view of a part of FIG. 9B. FIG. 9E is an enlarged view of a part of FIG. 9C. Circled areas in FIG. 9D and circled areas in FIG. 9E correspond to the same areas on the subject.

The image illustrated in FIG. 9B, captured with the subject 901 being in focus, and the image illustrated in FIG. 9C, captured with the subject 902 being in focus, need to be combined to form a combined image including the subject 901 and the subject 902 that are both in focus.

When the subject 901 and the subject 902 are far from each other in terms of depth, the subject 902 is largely blurred in the image captured with the subject 901 being in focus and the subject 901 is largely blurred in the image captured with the subject 902 being in focus. A subject largely blurred has a contour widened and faded, resulting in a subject behind the contour becoming visible through the contour. As illustrated in FIG. 9D, blurring of the farther subject 902 has no negative impact on the closer subject 901. However, as illustrated in FIG. 9E, blurring of the closer subject 901 results in the farther subject 902 becoming visible through the widened contour of the closer subject 901.

The circled areas in FIG. 9D each include the blurred farther object 902. The circled areas in FIG. 9E each include the blurred closer subject 901. In other words, in a combined image, either of the blurred subjects is included in the circled areas, regardless of which of the images illustrated in FIG. 9B and FIG. 9C is mainly used in the combining.

SUMMARY

The present disclosure is made in view of the above issues, and is directed to an image pickup apparatus that can reduce blurring in an image obtained by combining a plurality of images with different in-focus positions.

According to an aspect of the present disclosure, an image pickup apparatus includes an optical system, an image capturing unit, a combining unit configured to combine images captured by the image capturing unit, and a control unit configured to control an in-focus position and an aperture of the optical system. The control unit is configured to cause the image capturing unit to capture images while moving the in-focus position of the optical system to a plurality of positions to form a plurality of images with different in-focus positions, and to cause the image capturing unit to capture images with the aperture set to a depth of field deeper than depths of field for the plurality of images with the different in-focus positions to form a reference image. The combining unit is configured to compare the plurality of images with the difference in-focus positions and the reference image, and to combine images by using the plurality of images with the different in-focus positions and the reference image based on a result of comparison.

Further features and advantages will become apparent from the following description of exemplary embodiments with reference to the attached drawings.

DESCRIPTION OF THE EMBODIMENTS

An exemplary embodiment of the present disclosure is described in detail below with reference to the attached drawings.

Figure 1:
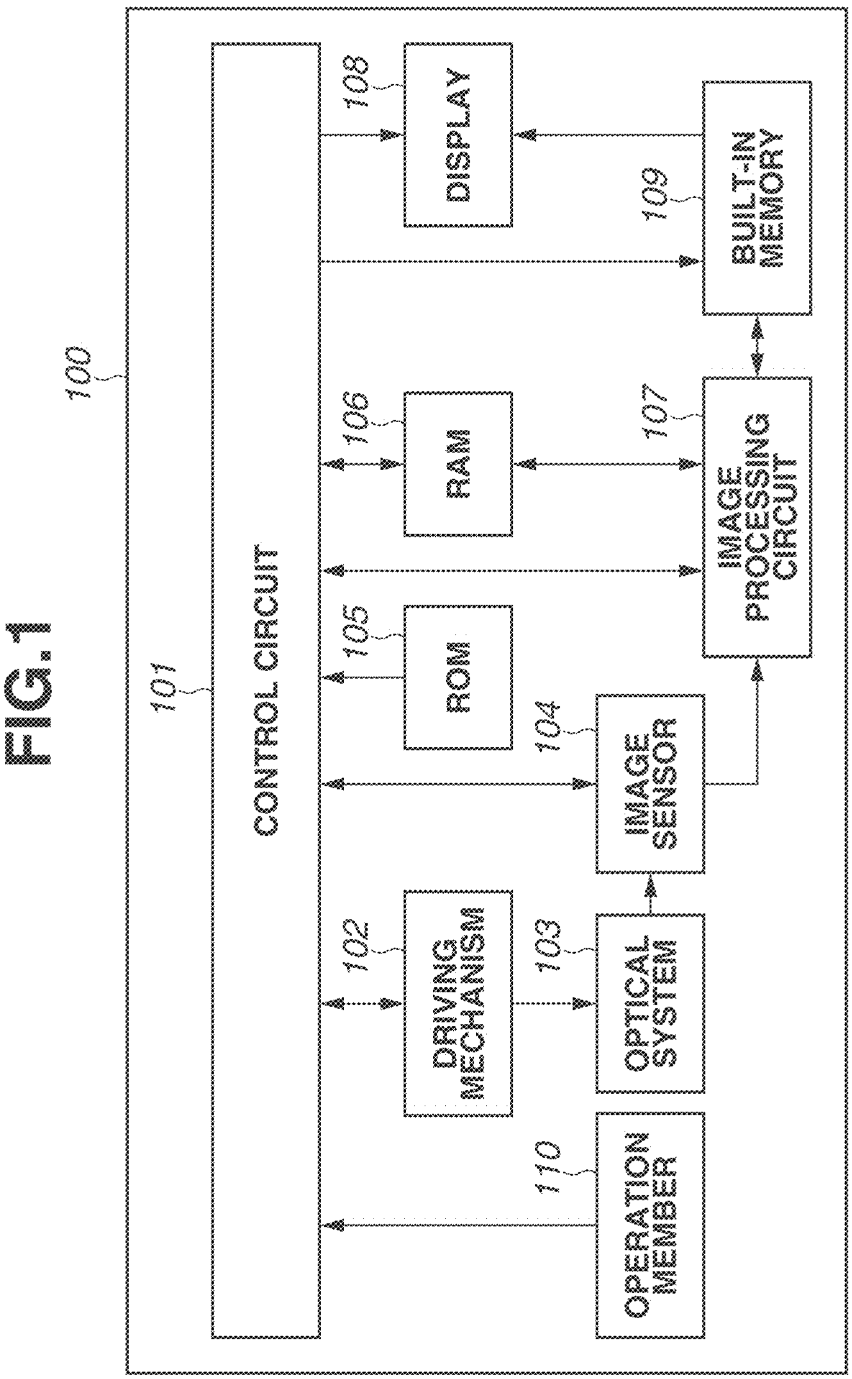
FIG. 1 is a block diagram illustrating a configuration of a digital camera according to an exemplary embodiment of an image pickup apparatus disclosed herein.

FIG. 1 is a block diagram illustrating a configuration of a digital camera according to the present exemplary embodiment.

A control circuit 101, which is a signal processor such as a central processing unit (CPU) or a micro processing unit (MPU), reads a program stored in advance in a read only memory (ROM) 105 described below, and controls components of a digital camera 100. For example, as described below, the control circuit 101 issues a command for starting and stopping image capturing to an image sensor 104 described below. The control circuit 101 further issues a command for executing image processing to an image processing circuit 107 described below, based on a program stored in the ROM 105. A user uses an operation member 110 described below to input a command to the digital camera 100. The command reaches the components of the digital camera 100 through the control circuit 101.

A driving mechanism 102, including a motor, mechanically operates an optical system 103 described below, based on a command from the control circuit 101. For example, the driving mechanism 102 moves the position of a focus lens in the optical system 103 to adjust the focal length of the optical system 103, based on a command from the control circuit 101.

The optical system 103 includes a zoom lens, the focus lens, and an aperture stop serving as a mechanism for adjusting a quantity of light transmitted to the image sensor 104. The in-focus position can be changed by changing the position of the focus lens.

The image sensor 104 is a photoelectric conversion element for photoelectrically converting an incident optical signal (light flux) into an electrical signal. For example, a charged coupled device (CCD), a complementary metal oxide semiconductor (CMOS) sensor, or the like may be used as the image sensor 104.

Figure 2:
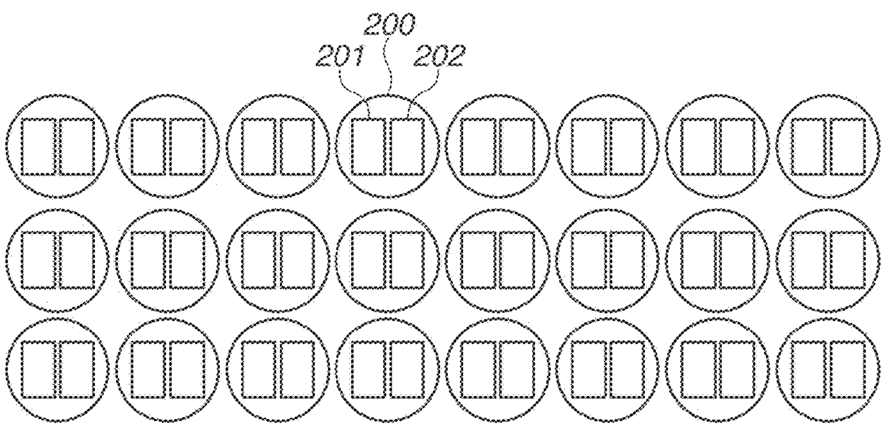
FIG. 2 is a diagram illustrating an example of a sensor array forming an image sensor that can acquire distance information on a subject, according the exemplary embodiment.

FIG. 2 is a diagram illustrating an example of a sensor array that forms the image sensor 104 capable of acquiring distance information on a subject according to the present exemplary embodiment. More specifically, FIG. 2 illustrates a configuration in which each pixel includes two photoelectric conversion units 201 and 202, where each photoelectric conversion unit is capable of reading an optical signal independently from each other. The number of photoelectric conversion units in each of the pixels 200 is not limited to two and may be three or more. In one known technique, a single pixel is divided in two in both horizontal and vertical directions, so that four photoelectric conversion units can be provided. In the following explanation, the configuration in which a single pixel includes two photoelectric conversion units is described.

Figure 3:
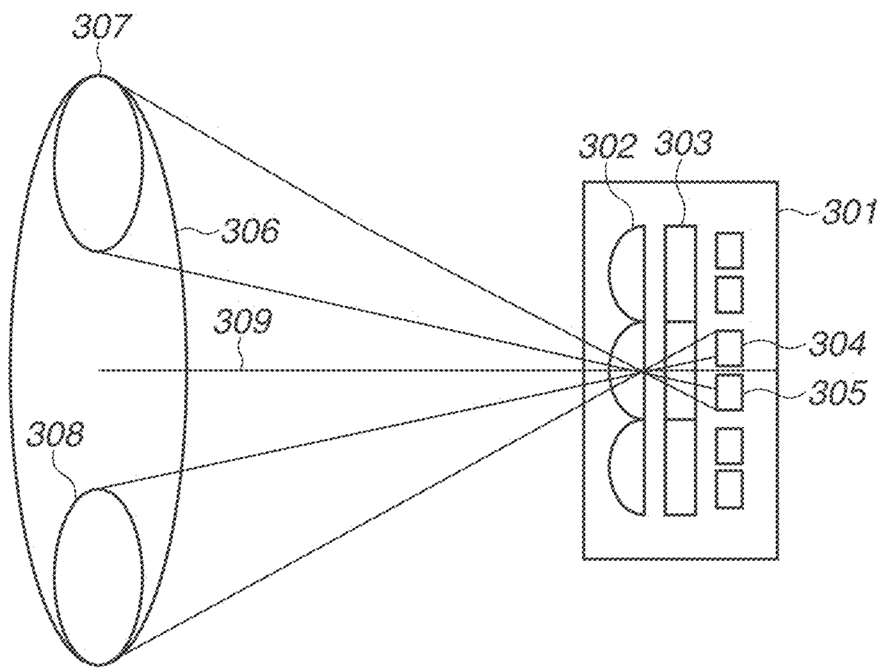
FIG. 3 is a diagram illustrating how an optical signal is incident on a pixel including a plurality of photoelectric conversion units, according the exemplary embodiment.

FIG. 3 is a diagram illustrating how the optical signal is incident on the pixel including a plurality of photoelectric conversion units, according to the present exemplary embodiment.

FIG. 3 illustrates a sensor array 301 including micro lenses 302, color filters 303, and photoelectric conversion units 304 and 305. The photoelectric conversion units 304 and 305 belong to the same pixel and corresponds to one common micro lens 302 and one common color filter 303. In FIG. 3, the two photoelectric conversion units 304 and 305, corresponding to a single pixel, are arranged side by side. Light fluxes output from an exit pupil 306 include an upper light flux (a light flux from a pupil area 307) and a lower light flux (a light flux from a pupil area 308), on upper and lower sides of an optical axis 309, respectively, incident on the photoelectric conversion unit 305 and the photoelectric conversion unit 304. In other words, the photoelectric conversion units 304 and 305 receive light from different areas of the exit pupil of an imaging lens. An image formed from a signal received by the photoelectric conversion unit 304 of each pixel is referred to as an image A. An image formed from a signal received by the photoelectric conversion unit 305 of each pixel is referred to as an image B. Based on a phase difference between a pair of pupil divided images including the image A and the image B, a defocus amount can be calculated, and the distance information can be acquired. When pixels, each including two photoelectric conversion units, are arranged over the entire image sensor 104, the digital camera 100 can obtain distance information on a subject at any position on a screen.

The distance information can also be obtained by an image sensor including general pixels instead of the pixels each including the two photoelectric conversion units. For example, the control circuit 101 causes the image sensor 104 to perform an image capturing operation while changing positional relationship among a plurality of lenses in the optical system 103, to form a plurality of images with different in-focus positions. The image processing circuit 107 described below divides each of the images into blocks and calculates contrasts of the blocks obtained by the division. More specifically, the image processing circuit 107 compares the contrasts of the blocks at the same position, in the plurality of captured images, with each other, and determines that the block with the highest contrast is an in-focus block. Finally, the image processing circuit 107 may use the in-focus position of the image including the in-focus block to obtain distance information on each block.

The ROM 105 is a read only nonvolatile memory serving as a recording medium, and stores therein an operation program for each component of the digital camera 100, a parameter required for an operation of each component, and the like. A random access memory (RAM) 106 is a rewritable volatile memory and is used as a temporary storage area for data output as a result of an operation of each component of the digital camera 100.

The image processing circuit 107 executes various types of image processing, including white balance adjustment, color interpolation, and filtering, on data of an image output from the image sensor 104 or on data of an image recoded in a built-in memory 109. The image processing circuit 107 further executes compression processing, based on a standard such as Joint Photographic Experts Group (JPEG), on data of a captured image obtained by the image sensor 104.

The image processing circuit 107 includes an application specific integrated circuit (ASIC) including circuits for executing specific processing. Alternatively, the control circuit 101 may execute the processing based on a program read from the ROM 105 to fulfill some or all of the functions of the image processing circuit 107. When the control circuit 101 fulfills all of the functions of the image processing circuit 107, the image processing circuit 107 as hardware may be omitted.

A display 108 is a liquid crystal display or an organic electroluminescence display that displays an image temporarily stored in the RAM 106, an image stored in the built-in memory 109 described below, a setting screen of the digital camera 100, or the like. The display 108 can display an image acquired by the image sensor 104 as a display image real-time, and thus can perform what is known as live view display.

The built-in memory 109 stores a captured image obtained by the image sensor 104, an image on which the processing has been executed by the image processing circuit 107, and information on an in-focus position used for image capturing. A memory card or the like may be used instead of the built-in memory.

The operation member 110 includes, for example, a button, a switch, a key, and a mode dial provided on the digital camera 100, as well as a touch panel that is also used as the display 108. The control circuit 101 receives a command input by the user by using the operation member 110, and controls operations of the components of the digital camera 100 based on this command.

FIG. 4A to FIG. 4D illustrate how a subject image is formed on an image forming plane, according to the present exemplary embodiment.

Figure 4A:
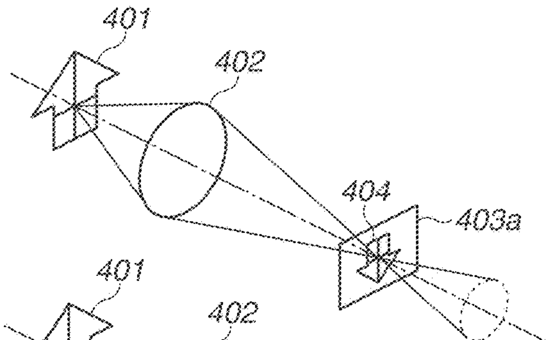
FIGS. 4A, 4B, 4C, and 4D are diagrams illustrating how an image of a subject is formed on an imaging plane according to the exemplary embodiment.

FIG. 4A illustrates a state where an image of the subject 401 is formed as an image 404 on a plane 403*a* by the optical lens 402. More specifically, when the plane 403*a* and an image sensor plane of the image sensor 104 coincide with each other, the image of the subject 401 is formed as a "spot" on the plane 403*a* and is recorded as an in-focus image.

Figure 4B:
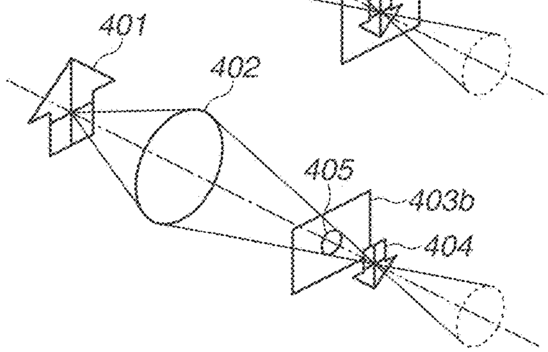

FIG. 4B illustrates a state where the imaging plane and the image sensor plane do not coincide with each other. When an image sensor plane 403*b* is at a position different from that of the plane 403*a* in FIG. 4A, the image of the subject 401 is formed as a circle of confusion 405 on the image sensor plane 403*b* by the optical lens 402. When the circle of confusion 405 is not larger than a permissible circle of confusion of the image sensor, the circle of confusion 405 can be regarded as being equivalent to the "spot" in the in-focus state. As a result, an image equivalent to the in-focus image can be obtained. When the circle of confusion 405 is larger than the permissible circle of confusion, a blurred image is obtained on the image sensor plane 403*b*.

Figure 4C:
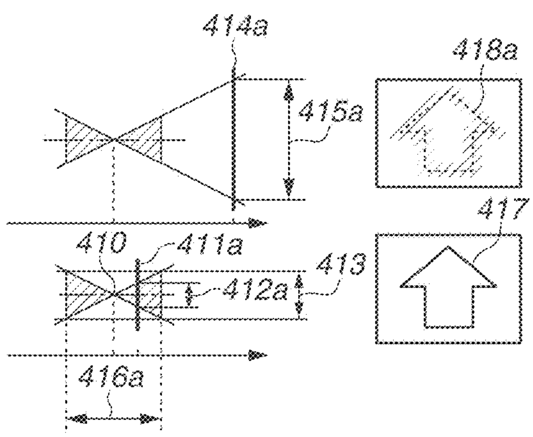

FIG. 4C is a side view illustrating the state described above. When the image of the subject 401 is formed at a focal point 410 while the image sensor plane is located at a position of the plane 411*a*, a circle-of-confusion diameter 412*a* is obtained. This circle-of-confusion diameter 412*a* is not larger than the permissible circle-of-confusion diameter 413 of the image sensor. For this reason, an image 417 to be recorded by the image sensor is an in-focus image with no blurring. When the image sensor plane is located at a position of a plane 414*a*, a circle-of-confusion diameter 415*a* is larger than the permissible circle-of-confusion diameter 413. As a result, an image 418*a* on the image sensor plane 414*a* is blurred. A hatched area where the circle-of-confusion diameter 412*a* is not larger than the permissible circle-of-confusion diameter 413 represents a depth of focus 416*a*. The depth of focus 416*a* is converted and replaced with a value at a subject side, thereby a depth of field is obtained.

Figure 4D:
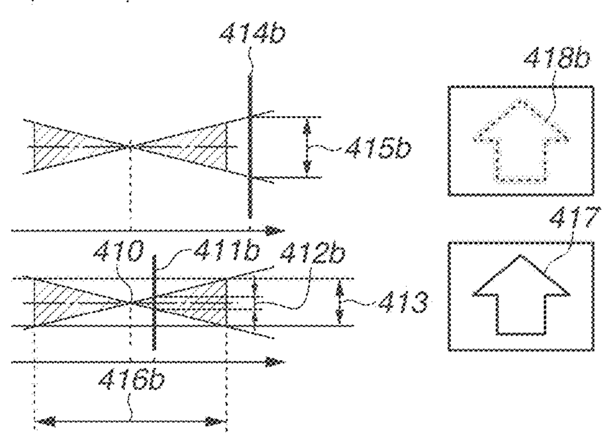

FIG. 4D illustrates a state where the aperture stop is closed, in contrast with the state illustrated in FIG. 4C. As a result of closing the aperture stop, the circle-of-confusion diameters 412*a* and 415*a* in FIG. 4C are changed to a circle-of-confusion diameter 412*b* relative to the plane 411*b* and a circle-of-confusion diameter 415*b* relative to a plane 414*b*, respectively. The circle-of-confusion diameter 415*b* in FIG. 4D is smaller than the circle-of-confusion diameter 415*a* in FIG. 4C. For this reason, an amount of blurring of an image 418*b* to be obtained under this condition is smaller than that of the image 418*a*. Furthermore, a depth of focus 416*b* to be obtained under this condition is deeper than the depth of focus 416*a*.

Figure 5:
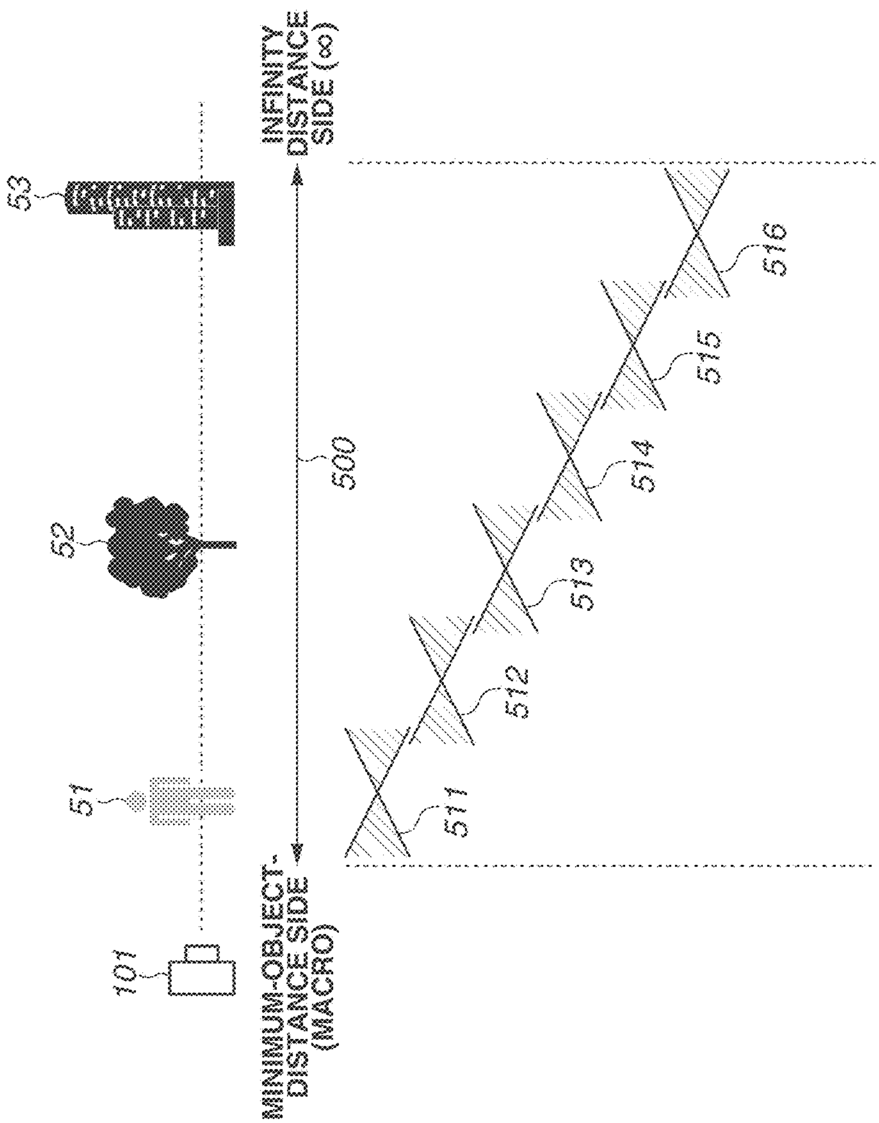
FIG. 5 is a diagram illustrating an image capturing operation for focus stacking, according to an exemplary embodiment.

FIG. 5 is a diagram illustrating an image capturing operation for focus stacking according to the present exemplary embodiment. Here, subjects 51 to 53 are assumed as objects to be in focus. The subjects 51 to 53, at different distances, are positioned in this order from the digital camera 100 (in a direction from the minimum-object-distance side to the infinity distance side). An image of each of the subjects 51, 52, to 53 is preferably captured with a shallow depth of field to obtain an image in which each of the subjects 51 to 53 is perceived with high resolution. For this reason, a focal range 500 (bracket range) for focus bracketing needs to be covered by depths of focus for a plurality of in-focus positions, to obtain a focus stacking image in which all of the plurality of subjects 51 to 53 are in focus. Depths of focus 511 to 516, each representing the depth of focus in a corresponding image capturing operation, are arranged to cover the focal range 500. In other words, each of the subjects 51 to 53 within the focal range 500 is in focus in one of images captured with in-focus positions being set to correspond to the depths of focus 511, 512, 513, 514, 515, to 516 (six image capturing operations). An image in which the entire area over the focal range 500 (entire bracket) is in focus can be obtained by combining areas within the depths of focus in a plurality of images thus captured.

However, even if the image is captured as illustrated in FIG. 5, a combined image may still include a subject partially blurred, depending on a status of the subject as described above. Accordingly, in the present exemplary embodiment, image capturing is performed in a manner described below so that a subject in the combined image is less likely to be partially blurred.

<Exemplary Flowchart for Implementing an Algorithmic Process>

Figure 6:
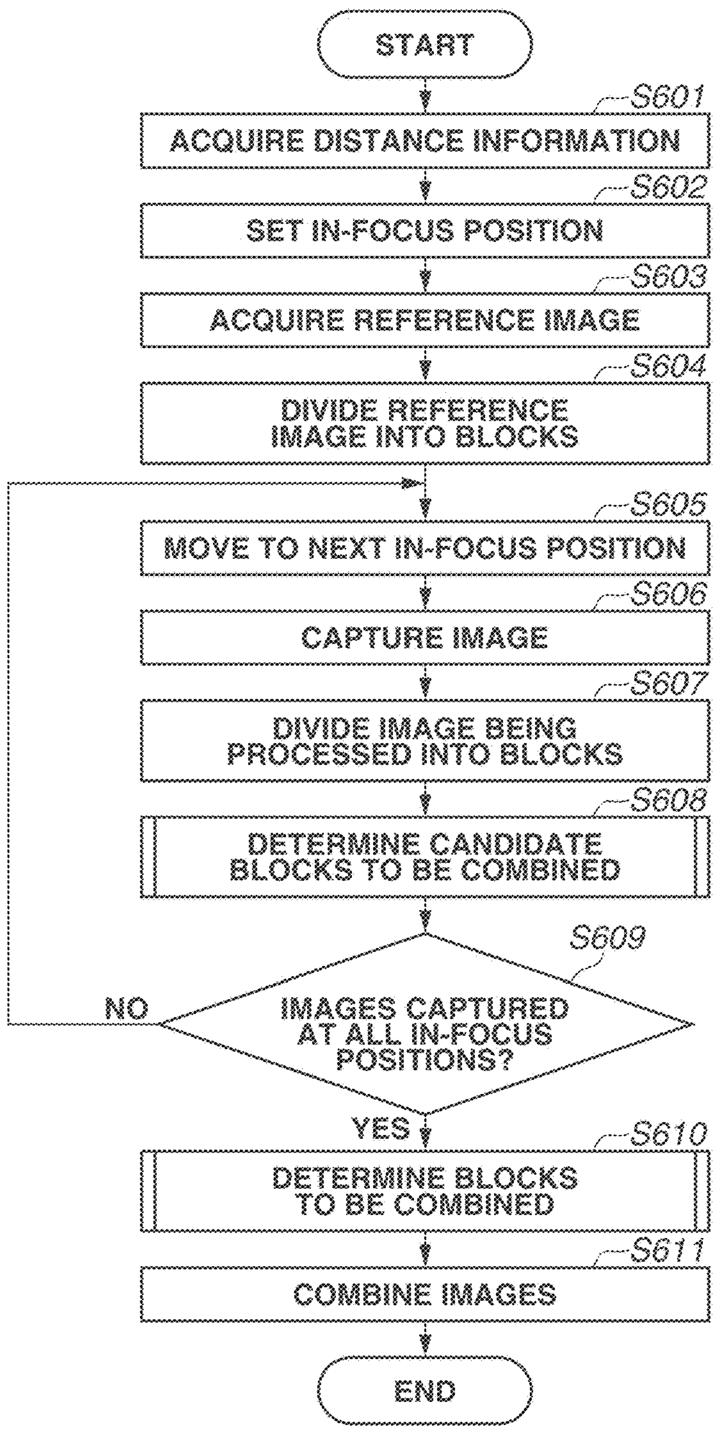
FIG. 6 is a flowchart illustrating processing for the focus stacking, according to the exemplary embodiment.

FIG. 6 is a flowchart illustrating an algorithm for focus stacking processing according to the present exemplary embodiment.

In step S601, the control circuit 101 acquires as described above, and temporarily stores the information in the RAM 106.

In step S602, the control circuit 101 sets in-focus positions. For example, a user designates a position of a subject to be in focus by using the touch panel function serving as the display 108. The control circuit 101 reads distance information corresponding to the position thus designated, from the RAM 106. A plurality of in-focus positions is set at equal intervals in front of and behind a position indicated by the distance information. The in-focus positions are set within a range of a depth of field that can be covered in a case where the digital camera closes the aperture stop as much as possible. In another example, the control circuit 101 determines a subject area in a subject that is the same as the subject at the position touched by the user, based on brightness and a color difference in an image. Then, the control circuit 101 sets the plurality of in-focus positions within a range between positions closest to and farthest from the camera indicated by pieces of distance information corresponding to the subject area. In yet another example, the control circuit 101 detects a face in an image using a known face detection function. When a plurality of faces is detected, a plurality of in-focus positions is set to include a face closest to the camera and a face farthest from the camera.

In this process, the control circuit 101 determines an image capturing order for the in-focus positions thus set. The image capturing order is not particularly limited. Generally, the in-focus position is sequentially moved from the minimum-object-distance side toward the infinity distance side or from the infinity distance side toward the minimum-object-distance side.

In step S603, the image sensor 104 acquires a reference image. The control circuit 101 sets a depth of focus for capturing the reference image, to include all of the in-focus positions set in step S602. The reference image is preferably captured in a single image capturing operation with the aperture stop of the digital camera closed. The depth of focus with the aperture stop closed as much as possible may fail to include all of the in-focus positions. In such a case, images with different in-focus positions are combined to form a single image with all of the subjects included within the depth of field. In such a case, image capturing is performed a plurality of times with the aperture stop closed as much as possible to achieve a deep depth of focus, so that blurring of an out-of-focus subject can be minimized.

The reference image is captured with the aperture stop closed as much as possible. For this reason, the blurring of the subject is reduced at the expense of high resolution. Therefore, the reference image can be regarded as an image in which each of a plurality of subjects is in focus, but is insufficient in terms of image quality.

In step S604, the image processing circuit 107 divides the reference image into blocks. The blocks are preferably set to have an appropriate size while taking a balance between a processing load and an accuracy of comparison into consideration as described below in association with step S702.

In step S605, the control circuit 101 moves the focus lens in the optical system 103 so that the in-focus position is moved to the next position, based on the image capturing order set by the control circuit 101 in step S601.

In step S606, the image sensor 104 captures an image. As illustrated in FIG. 5, the digital camera 100 sets a depth of focus, for capturing the image in step S606, to be shallower than that for capturing the reference image in step S603. Images with all of the in-focus positions within the depth of focuses 511 to 516 in FIG. 5 may be captured with the same depth of focus. The digital camera 100 repeats the processing in step S606 to capture images with all of the in-focus positions between the closest object and the farthest object.

In step S607, the image processing circuit 107 divides an image being processed (the image captured by the image sensor 104 in step S606) into blocks. The image processing circuit 107 divides the image being processed in a manner that is the same as that in step S604, to be used for comparison in step S609 described below.

In step S608, the control circuit 101 determines candidate blocks to be combined. More specifically, the control circuit 101 compares the image captured by the image sensor 104 in step S606 with the reference image acquired in step S603, and determines the candidate blocks to be combined based on the result of the comparison. This determination processing is described in detail below with reference to FIG. 7.

In step S609, the control circuit 101 determines whether the images with all of the in-focus positions set in step S602 have been captured. When the images with all of the in-focus positions have been captured (Yes in step S609), the processing proceeds to step S610. On the other hand, when the images with all of the in-focus positions have not been captured yet (No in step S609), the processing returns to step S605.

In step S610, the control circuit 101 determines blocks to be combined, to form a combined image, from the candidate blocks to be combined determined in step S608 and the blocks of the reference image. The processing in step S610 is described in detail below with reference to FIG. 8.

In step S611, the image processing circuit 107 performs image combining using the blocks to be combined determined by the control circuit 101 in step S610. The image processing circuit 107 uses the blocks to be combined described above to generate a combination map. More specifically, a combination ratio is set to be 100% for a pixel (or an area of interest) within the blocks to be combined in a plurality of images, and is set to be 0% for other pixels. The image processing circuit 107 replaces a pixel at each position in a plurality of images captured by the image sensor 104 in step S606 based on such a combination map, to form a new image. The image thus formed by the image processing circuit 107 by replacing pixels based on the combination map may involve a large difference between adjacent pixels in a pixel value. This may result in an abnormality in the boundary between combined parts. To prevent such a large difference between adjacent pixels in the pixel value, the image processing circuit 107 may apply a filter such as a Gaussian filter on the image formed by the image processing circuit 107 by replacing the pixels based on the combination map. In this way, the image processing circuit 107 can form a combined image without abnormalities in the boundaries of combined parts.

<Determination of Candidate Block to be Combined>

The processing of determining the candidate blocks to be combined in step S608 is described in detail below with reference to FIG. 7.

Figure 7:
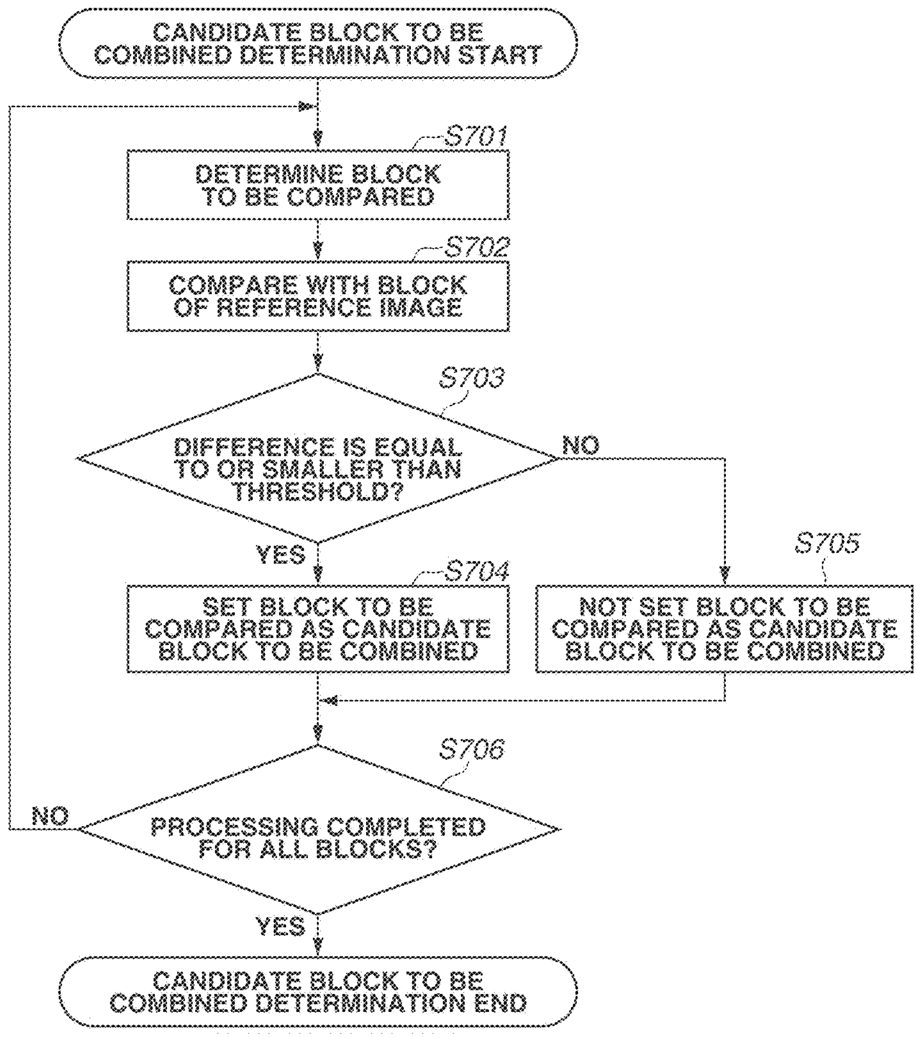
FIG. 7 is a flowchart illustrating processing for determining a candidate block to be combined, according to the exemplary embodiment.

FIG. 7 is a flowchart illustrating the processing of determining the candidate blocks to be combined.

In step S701, the image processing circuit 107 determines a block to be compared from the blocks of the image being processed that have not been compared with the blocks of the reference image. The image processing circuit 107 determines the block to be compared based on a certain order. For example, the image processing circuit 107 can compare the blocks in an order by the positions in the images, such as from upper left to upper right, then lower left to lower right.

In step S702, the image processing circuit 107 compares the block determined in step S701 with a block of the reference image, at the same position as the block to be compared, based on brightness information or color information. When the block includes a plurality of pixels, the comparison is based on an average value of the brightness information or the color information on the plurality of pixels in the block. In step S703, the image processing circuit 107 determines a difference in brightness or color information between the block of the image being processed and the block of the reference image. When the difference between the block of the image being processed and the block of the reference image in the brightness information or the color information does not exceed a predetermined threshold (Yes in step S703), the processing proceeds to step S704. In step S704, the image processing circuit 107 sets the block determined in step S701 as the candidate block to be combined. On the other hand, when the difference exceeds the threshold (No in step S703), the processing proceeds to step S705. In step S705, the image processing circuit 107 excludes the block determined in step S701 from being the candidate block to be combined.

The reason why the processing is executed as described above will be briefly described. As described above, the image sensor 104 captures the reference image with the deepest possible depth of field, so that the blurring is minimized. It can be assumed that a block to be compared is largely blurred if the brightness information or the color information of the block of the image being processed is largely different from that of a block at the same position in such a reference image with the blurring thus reduced. The pixel in such a largely blurred block is not desirable in the combined image, and thus the image processing circuit 107 excludes such a largely blurred block from being the candidate block to be combined.

When the block of the image being processed and the block of the reference image each include a single pixel, a noise component included in information on each of the pixels has a large impact. For this reason, the blocks each preferably include a plurality of pixels. Still, when the block is set to have a size much larger than the size of the blurred area, the averaging may reduce the impact of the blurring. Therefore, the block is preferably set to have a size, considering a balance between the processing load and the accuracy of the comparison. The size of the block must be at least greater than one pixel, and it should be set larger if greater accuracy of the comparison is needed.

In step S706, the image processing circuit 107 determines whether the processing has been completed for all of the blocks of the image being processed. When the processing has been completed (Yes in step S706), the candidate block to be combined determination is terminated. On the other hand, when the processing has not been completed yet (No in step S706), the processing returns to step S701.

The mode described above is merely an example, and can be modified in various ways. For example, the difference to be compared with the threshold in step S703 may be based on both the brightness information and the color information on the blocks. Then, the image processing circuit 107 may set the block of the image being processed to the block to be combined if the difference in both the brightness information and the color information does not exceed the threshold. Furthermore, in step S703, the threshold may be compared with a quotient of the brightness information or the color information on the block of the image being processed and the brightness information or the color information on the block of the reference image, instead of the difference therebetween, to determine the level of difference between the blocks.

<Block to be Combined Determination>

The block to be combined determination in step S610 is described in detail below. In this step, the image processing circuit 107 determines which one of the images captured by the image sensor 104 in step S606 and the reference image is to be used in the combining, for each of the blocks as a result of the dividing.

Figure 8:
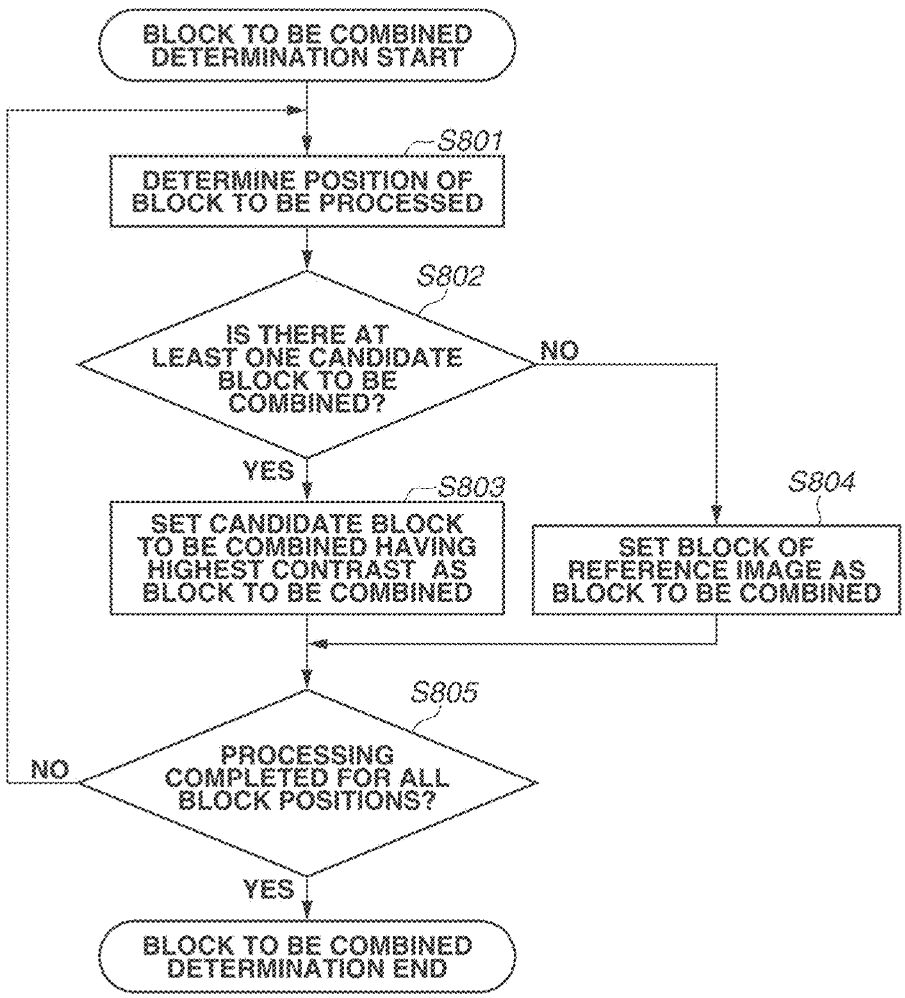
FIG. 8 is a flowchart illustrating processing for determining a block to be combined, according to the exemplary embodiment.
Figure 9A:
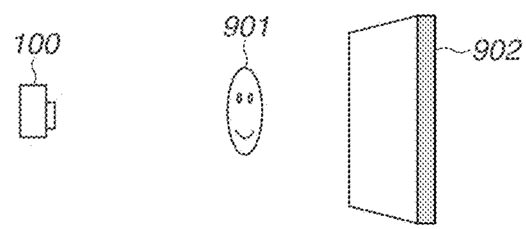
FIGS. 9A, 9B, 9C, 9D, and 9E are diagrams illustrating an issue to be addressed.
Figure 9B:
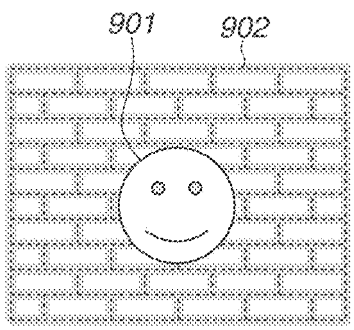
Figure 9C:
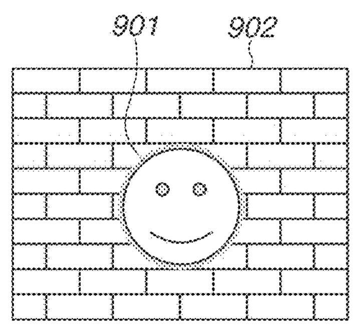
Figure 9D:
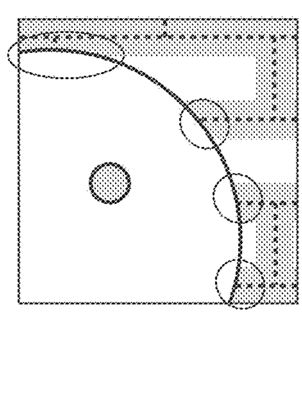
Figure 9E:
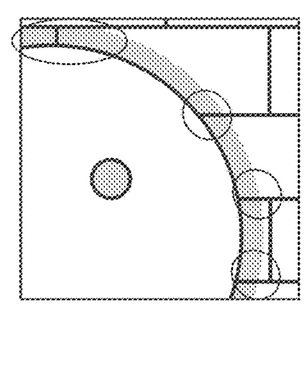

FIG. 8 is a flowchart illustrating the processing of determining the block to be combined (S610), according to the present exemplary embodiment. In step S801, the image processing circuit 107 determines which block to be dealt with judging whether to operate processing of combining in step S802. The image processing circuit 107 determines the block by its position, from positions of blocks not yet to be processed through step S802. The image processing circuit 107 determines the block in a certain order, for example, by the order of position of blocks in the image, such as from upper left to lower right.

In step S802, the control circuit 101 determines whether the image processing circuit 107 has set at least one candidate block to be combined in step S704. When there is at least one candidate block to be combined (Yes in step S802), the processing proceeds to step S803. In step S803, the image processing circuit 107 selects a candidate block having the highest contrast from the candidate blocks to be combined, and sets the selected candidate block to be combined to the block to be combined. It is a matter of course that when there is only one candidate block to be combined, this block is set to the block to be combined. When there is no candidate block to be combined (No in step S602), the processing proceeds to step S804. In step S804, the image processing circuit 107 sets a block of the reference image at the same position to the block to be combined.

More specifically, there may be a blurring area in the combined image regardless of which one of images with different in-focus positions is used for the area in the combining, as described above with reference to FIGS. 9A-9E. For such an area, the reference image, in which none of the subjects is largely blurred, is used in the combining, so that the blurring in the area can be reduced in the combined image. Still, the reference image has a lower perceived resolution than the other images. For this reason, the reference image is used in the combining only for the area that would otherwise be blurred regardless of which one of the images with the different in-focus positions is used in the combining.

When only the brightness information on the image is used for the comparison in step S702, the image processing circuit 107 in step S803 may further compare the candidate blocks to be combined and the corresponding block of the reference image with each other based on the color information. A pixel determined to have a difference of a predetermine value or more from the reference image, as a result of the comparison, is replaced with a corresponding pixel in the block of the reference image. In this way, the user can be prevented from feeling strangeness due to the difference in the color information.

In step S805, the control circuit 101 determines whether the processing has been completed for the all blocks at all the positions. When the processing has been completed for all the blocks (Yes in step S805), the block to be combined determination is terminated. On the other hand, when the processing has not been completed for all the blocks yet (No in step S805), the processing returns to step S801. The blocks to be combined thus determined are used in the image combining in step S611 described above.

As described above, the focus stacking according to the present exemplary embodiment is performed to combine a plurality of images with different in-focus positions, with a reference image formed separately from the plurality of images. The reference image is captured with a depth of focus covering the in-focus positions corresponding to the plurality of images. The image processing circuit 107 compares each of the images with a plurality of in-focus positions with the reference image to determine an area largely affected by blurring. When there is the area largely affected by the blurring in all the images with a plurality of in-focus positions, the reference image is used for the area in the combining. This ensures that the combined image is less likely to include blurring.

In the exemplary embodiment described above, an example of the image pickup apparatus is implemented by using the digital camera. However, the exemplary embodiment is not limited to the digital camera. For example, other exemplary embodiments of the image pickup apparatus may be implemented using a mobile device including an image sensor, a network camera having an image capturing function, or the like.

The digital camera may be used for capturing the reference image and capturing a plurality of images with different in-focus positions, but the processing can be performed elsewhere. In such a case, for example, an external image processing device that has acquired these images from the digital camera may be used for determining the candidate block to be combined and the block to be combined. In other words, an exemplary embodiment may be implemented with an image processing device having the same functions as the image processing circuit 107 and acquiring the reference image and the plurality of images with the different in-focus positions formed, from the external apparatus.

Furthermore, an exemplary embodiment or a part thereof may be implemented by processing including supplying a program for implementing one or more of the functions of the exemplary embodiment described above to a system or an apparatus via a network or a storage medium and causing one or more processors in a computer of the system or the apparatus to read and execute the program. Certain aspects of the present disclosure can also be implemented with a circuit (for example, an ASIC) to perform one or more of the functions illustrated in the various drawings and described in the various embodiments.

A configuration according to an embodiment can provide an image pickup apparatus that can reduce blurring in an image obtained by combining a plurality of images with different in-focus positions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest reasonable interpretation so as to encompass all modifications and equivalent structures and functions.

This application claims the benefit of Japanese Patent Application No. 2017-072926, filed Mar. 31, 2017, which is hereby incorporated, by reference herein in its entirety.

What is claimed is:

1. An image pickup apparatus, comprising:

an optical system;

an image capturing unit;

at least one memory configured to store instructions;

at least one processor in communication with the at least one memory configured to execute the instructions to combine images captured by the image capturing unit; and a control unit configured to control an in-focus position and an aperture of the optical system, wherein the control unit is configured to cause the image capturing unit to capture images while moving the in-focus position of the optical system to a plurality of positions to form a plurality of images with different in-focus positions, and to cause the image capturing unit to capture images with the aperture set to a depth of field deeper than depths of field for the plurality of images with the different in-focus positions to form a reference image, and wherein the at least one processor executes further instructions to make a comparison of the reference image to the plurality of images with the different in-focus positions, and to combine images by using the plurality of images with the different in-focus positions and the reference image based on a result of the comparison.

2. The image pickup apparatus according to claim 1, wherein the control unit is configured to set, when the reference image is formed, the aperture in such a manner chat the depth of field of the reference image includes all of the in-focus positions moved to the plurality of positions.

3. The image pickup apparatus according to claim 1, wherein the reference image is a combined image obtained by combining the images captured by the image capturing unit with the aperture set to the depth of field deeper than the depths of field for the plurality of images.

4. The image pickup apparatus according to claim 3, wherein a number of the images to be captured for forming the reference image is smaller than a number of the plurality of images with the different in-focus positions.

5. The image pickup apparatus according to claim 1, wherein the at least one processor executes further instructions to divide each of the reference image and the plurality of images with the different in-focus positions into a plurality of blocks, and to compare blocks of each of the plurality of images with the different in-focus positions and blocks of the reference image located at corresponding positions.

6. The image pickup apparatus according to claim 5, wherein in a case where none of the plurality of images with the different in-focus positions has a block in which a difference from the reference image is equal to or smaller than a threshold as a result of comparing a block of each of the plurality of images with the in-focus positions at a same certain position with a block of the reference image at a corresponding position, the at least one processor executes further instructions to combine the images by using the block of the reference image for the same certain position.

7. The image pickup apparatus according to claim 6, wherein in a case where some of the plurality of images with the different in-focus positions have blocks in which the difference from the reference image is equal to or smaller than the threshold, the combing unit is configured to combine the images by using the block of images for the same certain position having a highest contrast among the some of the plurality of images.

8. The image pickup apparatus according to claim 5, wherein the at least one processor executes further instructions to compare the plurality of images with the different in-focus positions and the reference image based on at least one of brightness information and color information.

9. The image pickup apparatus according to claim 7, wherein in a case where some of the plurality of images with the different in-focus positions have blocks in which the difference in the brightness information from the reference image is equal to or smaller than the threshold, the at least one processor executes further instructions to select a block of an image having a highest contrast among the some of the plurality of images, and wherein in a case where the selected block of the image includes a pixel in which a difference in the color information from the reference image is equal to or larger than a predetermined value, the color information on the pixel in the selected block of the image is replaced with the color information on the reference image.

10. The image pickup apparatus according to claim 1, wherein the different in-focus positions in the plurality of images are set at equal intervals.

11. The image pickup apparatus according to claim 5, further comprising an acquisition unit configured to acquire distance information on a subject, wherein the in-focus positions in the plurality of images with the different in-focus positions are set based on the distance information acquired by the acquisition unit.

12. The image pickup apparatus according to claim 11, wherein the in-focus positions in the plurality of images with the different in-focus positions are set at equal intervals between a closest position indicated by one of pieces of the distance information acquired by the acquisition unit and a farthest position indicated by another one of the pieces of the distance information acquired by the acquisition unit.

13. The image pickup apparatus according to claim 11, wherein the acquisition unit is configured to acquire the distance information based on a pair of pupil-divided images.

14. The image pickup apparatus according to claim 13, wherein the image capturing unit includes a plurality of photoelectric conversion units, wherein a single microlens is provided for each pair of photoelectric conversion units, and wherein the image capturing unit is configured to capture the pupil-divided images based on light fluxes detected by the each pair of photoelectric conversion units.

15. An image processing apparatus, comprising:

at least one memory configured to store instructions; and at least one processor in communication with the at least one memory and configured to execute the instructions to:

acquire a plurality of images captured by an image capturing unit while an in-focus position of an optical system is moved to a plurality of positions and a reference image with a depth of field deeper than any of depths of field for the plurality of images; and make a comparison of the reference image to the plurality of images, and to combine images using the plurality of images and the reference image based on a result of the comparison.

16. A control method of an image pickup apparatus including an optical system, an image capturing unit, a combining unit configured to combine images captured by the image capturing unit, and a control unit configured to control an in-focus position and an aperture of the optical system, the control method comprising:

forming a plurality of images with different in-focus positions by causing the image capturing unit to capture images while moving the in-focus position of the optical system to a plurality of positions;

forming a reference image by causing the image capturing unit to capture images with the aperture set to a depth of field deeper than depths of field for the plurality of images with the different in-focus positions; and comparing the reference image to the plurality of images with the different in-focus positions, and combining images by using the plurality of images with the different in-focus positions and the reference image based on a result of the comparing.

* * * * *